G. F. FOWLER.
CENTRIFUGAL SEPARATOR.
APPLICATION FILED MAR. 4, 1911.
1,069,058.
Patented July 29, 1913.
2 SHEETS—SHEET 1.
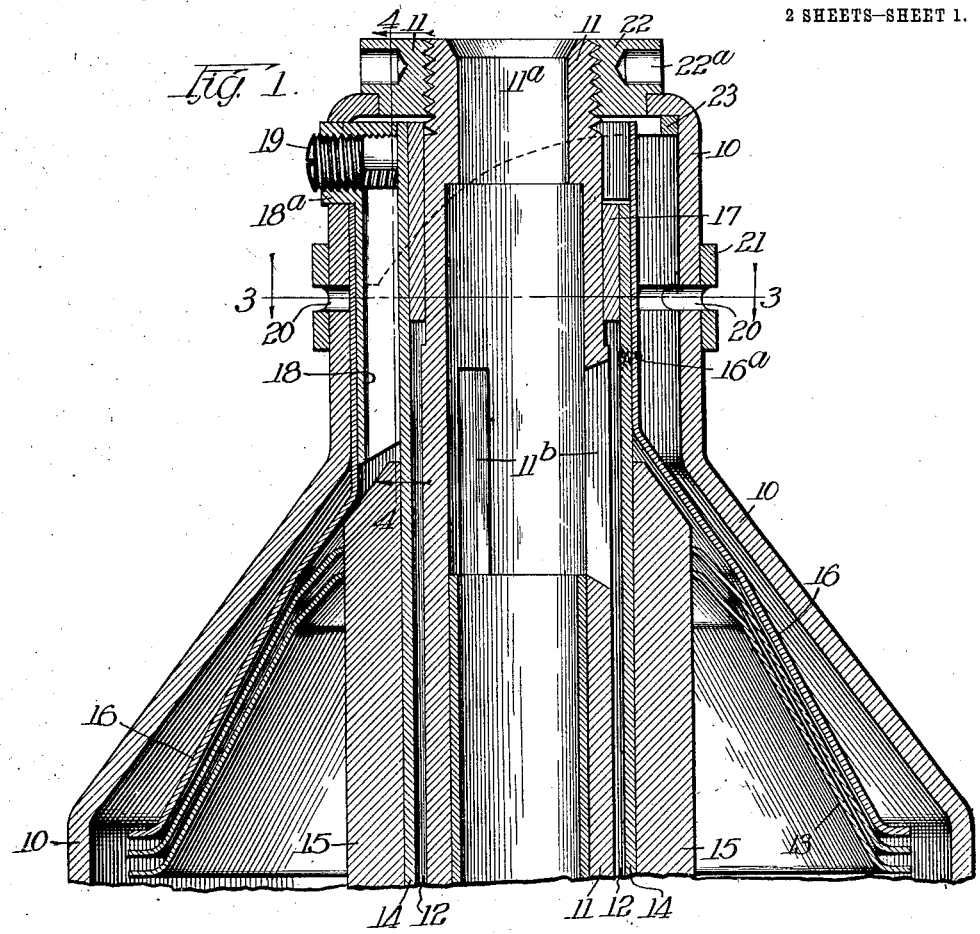
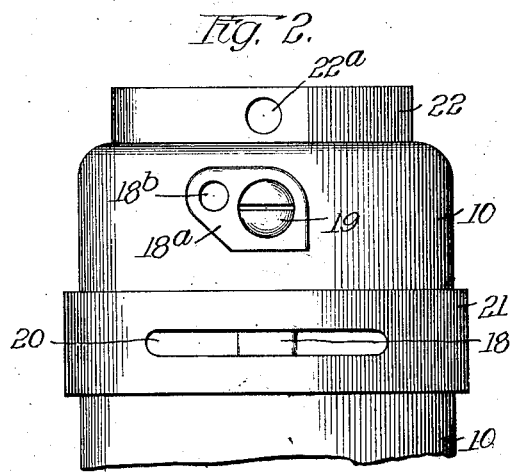

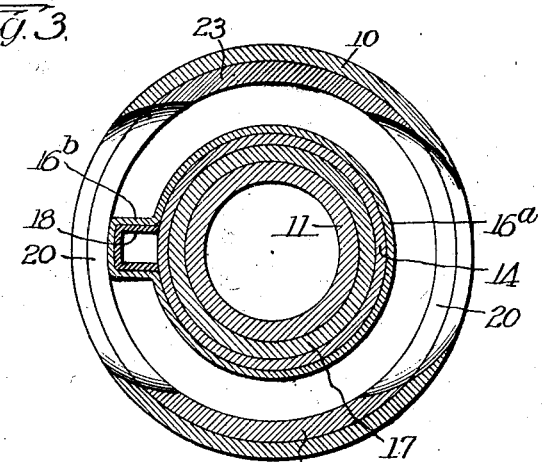
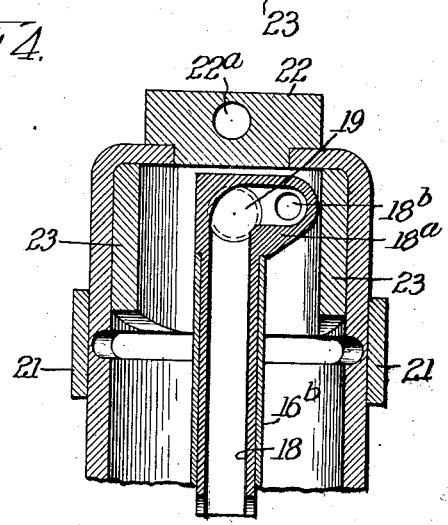
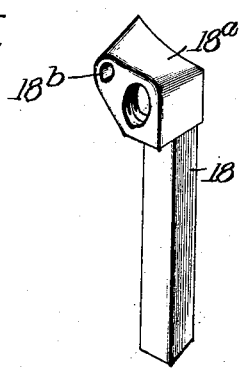

UNITED STATES PATENT OFFICE.

GORDON F. FOWLER, OF OAK PARK, ILLINOIS, ASSIGNOR TO SEARS, ROEBUCK & COMPANY, OF CHICAGO, ILLINOIS, A CORPORATION OF NEW YORK.

CENTRIFUGAL SEPARATOR.

1,069,058.  Specification of Letters Patent.  Patented July 29, 1913.

Application filed March 4, 1911. Serial No. 612,174.

*To all whom it may concern:*

Be it known that I, GORDON F. FOWLER, a citizen of the United States, residing at Oak Park, in the county of Cook and State of Illinois, have invented certain new and useful Improvements in Centrifugal Separators, of which the following is a specification.

The invention relates particularly to centrifugal liquid-separators such as are commonly used for separating cream from milk.

The primary object of the invention is to provide improved means for discharging the lighter separated liquid as the cream from the bowl, and the invention consists in the features of novelty hereinafter described, shown in the accompanying drawings forming part of this specification, and finally pointed out more specifically in the appended claim.

In the said drawings, Figure 1 is a vertical sectional view through the upper portion of a complete assembled bowl to which my invention is applied. Fig. 2 is a view in side elevation of a portion of the upper extremity of a bowl adjacent the cream discharge outlet. Fig. 3 is a sectional view taken on the line 3, 3, Fig. 1, looking downward. Fig. 4 is a broken vertical section through the cream outlet taken on line 4, 4, Fig. 1, looking in the direction indicated by the arrows. Fig. 5 is a detached perspective view of the cream discharge outlet.

10 represents the body of the bowl of a centrifugal liquid separator, the same being of the usual cylindrical form throughout the main body portion, the most of which is shown broken away in Fig. 1, the upper part thereof being contracted or conical in shape and terminating at its upper extremity in the cylindrical neck provided with discharge outlets for both the separated fluids which are of unequal densities, as for example, the cream and skim milk. The bowl 10 is the usual form as shown or any desired form, and in the embodiment of the invention herein illustrated is shown provided with the usual central member or core as indicated by the reference character 11, which is provided with a central vertical opening $11^a$, through which the fluid to be separated enters the top of the bowl.

The liquid may enter the separating chambers of the bowl from the central feeding passage $11^a$ in any desired manner as through the openings $11^b$, whence it is fed downwardly through the vertical channels 12 and thence distributed in any desired manner to the separating means, which may consist of the usual superimposed conical disks as illustrated in Fig. 1 and indicated by the reference character 13, or any other suitable separating means or liner. To close the vertical feed passage 12 the sleeve 14 may be employed in the bowl assembly, and to position the liner disks 13 in relation to the supporting core of the bowl the sleeve 14 may be provided with any suitable number of vertical ribs as indicated at 15, adapted to coöperate with suitable registering slots or openings in the periphery of the usual large central opening in the liner disks 13, not herein shown, since the same forms no part of the present invention.

Superimposed upon the top of the liner disks 13 is a conical skimming shield 16, which in its general form is similar to the liner disks 13, but is provided with the cylindrical portion $16^a$, which extends upwardly through the neck of the bowl surrounding the core for the liner disks, including the longitudinal sleeve 14 already referred to as well as the shorter sleeve 17 surrounding the central core 11, and being adapted to space the sleeve 14 therefrom to form the vertical feed passages 12, which feed the full milk to the liner above described.

The contracted neck of the skimming shield as indicated at $16^a$ is provided with an enlargement shown at $16^b$ adapted to take the cream discharge device which consists of the elongated channeled member 18 closed on three sides and open on the fourth side, and being provided with the discharge hood $18^a$ at the top thereof, consisting of an enlarged housing containing an interior passageway or channel at approximately right angles to the channel on the interior of the longitudinal portion of the member 18, the said angular channel terminating at its outer extremity in the cream discharge outlet $18^b$. At the right angular junction of the vertical and horizontal discharge passages the wall of the housing or hood $18^a$ is pierced and threaded to take the usual cream regulating screw 19.

As well known in this art, when a bowl containing a skimming device is surmounted by a skimming shield as indicated by the reference character 17 in the drawings, and a component liquid containing liquids of different densities as full milk is fed into the bowl in operation the fluid having the greatest density and specific gravity will be discharged outwardly beyond the peripheries of the liner disks and will tend to follow a path upwardly on the exterior of the skimming shield 16 adjacent the outer wall of the bowl and will eventually find its way to the skim milk discharge passages as indicated at 20, through which it will leave the bowl, to be discharged into the usual skim milk collecting and receiving devices. On the other hand, it is well known that fluid of least specific gravity or density will be displaced by the heavier component and will find its way toward the center of the bowl and ultimately traverse the passages on the interior of the skimming shield 16, eventually finding its way to the passages on the interior of the cream channeled discharge member 18, thence into the angular channel at the upper extremity of the member past the cream regulating screw 19 and leaving the bowl through the discharge outlet 18$^b$ to be received into the usual cream receiving and collecting devices. The vertical cream discharge passage on the interior of the channeled member 18 is preferably of uniform area in cross section to the upper extremity thereof, whence it is preferably deflected at approximately right angles and extends for some distance horizontally as indicated beyond the right angle turn in the passage and terminating in the discharge outlet 18$^b$ as described. The important features of the invention are comprised in this construction of the cream discharging means, as the angular channel which is practically of uniform area in cross section throughout its length will permit of the use of a cream regulating screw of larger diameter at the junction of the vertical and horizontal passages than if a cream screw be positioned at any other point in a cream discharge passage of given dimensions since it may be readily demonstrated that a circle of larger area may be inscribed at a right angular turn in the passage than at any other location in said passage, hence the use of the angular or deflected channel permits of the use of a cream screw of larger diameter than would be used in the usual perpendicular channel with the outlet above the screw, and this deflection of the outlet passage therefore secures easier regulation and because of the fact that the screw employed may be larger than if used in a straight passage the life of the screw will be much longer in proportion as the size thereof is increased, since it is found in practice that the wear on cream screws due to regulation in use is considerable and the deterioration due to such wear as well as to oxidation is proportionately less as the size thereof is increased. Also the use of the screw of larger diameter enables the size of the threads thereon and the corresponding threads in the bowl wall to be increased, all of which tends to increase the life of the parts and promote the ease of regulation of the cream discharge passage. It is also found that the horizontal deflection at the upper end of the cream discharge passage insures a cream of minimum froth, as the cream is arrested somewhat in its forward tangential discharge and strikes the covers of the cream collecting device with less force upon leaving the bowl. It is also found that the angular extension and enlargement at the upper end of the cream device enables the same to be fastened more securely to the neck of the skimming shield.

The use of the perpendicular channel in the cream discharge member permits the discharge of cream that is on a line with the skim-milk exit less only the thickness of the outer wall of the channel, thereby permitting a greater range of regulation. In the use of my improved device it is also found that cream rising in the channel is prevented from slipping, insuring a more perfect discharge than when the cream is collected and rises in a circular space with no means provided for keeping the cream at the same speed as the bowl. A further and very decided advantage of my improved cream discharge device is due to the fact that the cream discharge outlet is in approximately the same horizontal plane as the plane of the cream screw and not considerably above or below it and the advantage arises from the fact that when the discharge opening is above the screw as is usually the case, and leakage from the screw which is liable to occur when the screw is adjusted or when it becomes worn or corroded will escape from such opening around the screw and upon leaving the neck of the bowl tangentially due to the velocity thereof will be discharged in a plane below the level of the plane of the cream discharge passage and usually into the collecting device designed for receiving and collecting the skim milk, which to the extent that this occurs results in the undoing of the work of separation, and because of the loss of valuable materials is a result in centrifugal separation very much desired to be avoided.

The circumferential band 21 is employed around the neck of the bowl for the purpose of providing convenient means for grasping the bowl by the hand of the operator, and this band is provided with openings registering with the discharge outlet 20 in the bowl wall. For the purpose of assembling and securing the parts of the bowl together, any suitable means may be employed, that preferred being as shown in Figs. 1, 2 and 3, and consisting of the binding nut 22 threaded and adapted to coöperate with the threaded end at the upper extremity of the liner core 11, this nut being provided with suitabl means as the indentations 22ª, adapted to receive a suitable tool or wrench.

In order that the invention might be fully understood the details of the preferred embodiment thereof have been thus specifically described, but it is not desired to be limited to the exact details of construction herein shown for it will be apparent that those skilled in the art may differently construct many of the details without departing from the purpose and scope of the invention.

I claim:

A centrifugal separator bowl provided with a skimming device and separate discharge means for both cream and skimmed milk, one of said discharge means comprising a member provided with a passageway leading from the skimming device, said passageway having an intake opening communicating with the skimming chamber, there being a passageway communicating therewith and leading from the first said passageway to the exterior of the bowl, and extending at an approximately right angle thereto and forming a continuation thereof, and a regulating screw at the junction of the said passageways, said screw being threaded at an axis extending approximately at a right angle to the common plane of the said passageways and being adapted to control the opening therethrough.

In testimony whereof I have signed my name to this specification, in the presence of two subscribing witnesses, on this 1st day of March, A. D. 1911.

GORDON F. FOWLER.

Witnesses:
A. L. SPRINKLE,
CHAS. M. NISSEN.

Copies of this patent may be obtained for five cents each, by addressing the "Commissioner of Patents, Washington, D. C."